Sept. 11, 1962 T. W. BLASINGAME 3,053,573
BATCH BOX LOCKING DEVICE
Filed March 23, 1960 4 Sheets-Sheet 1
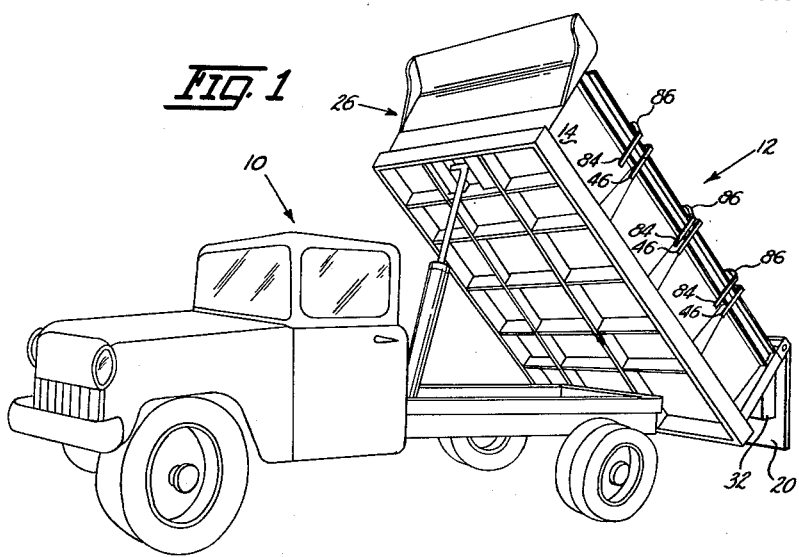
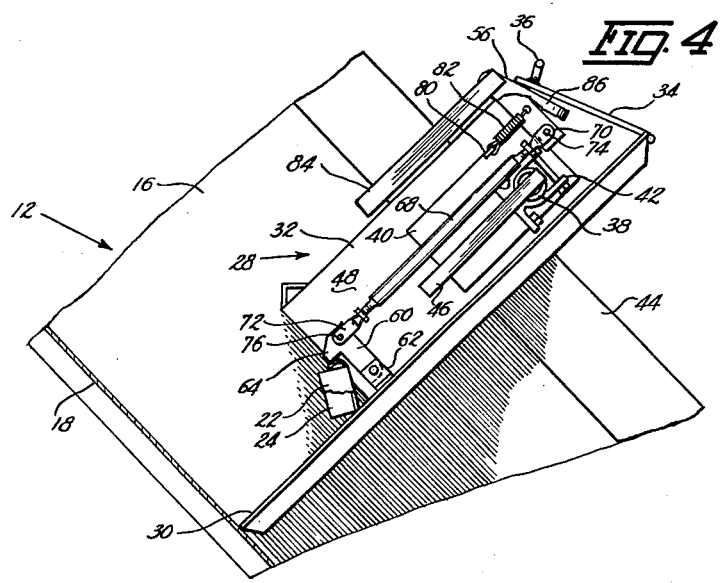
INVENTOR.
THOMAS W. BLASINGAME
BY [signature]
ATTORNEY.

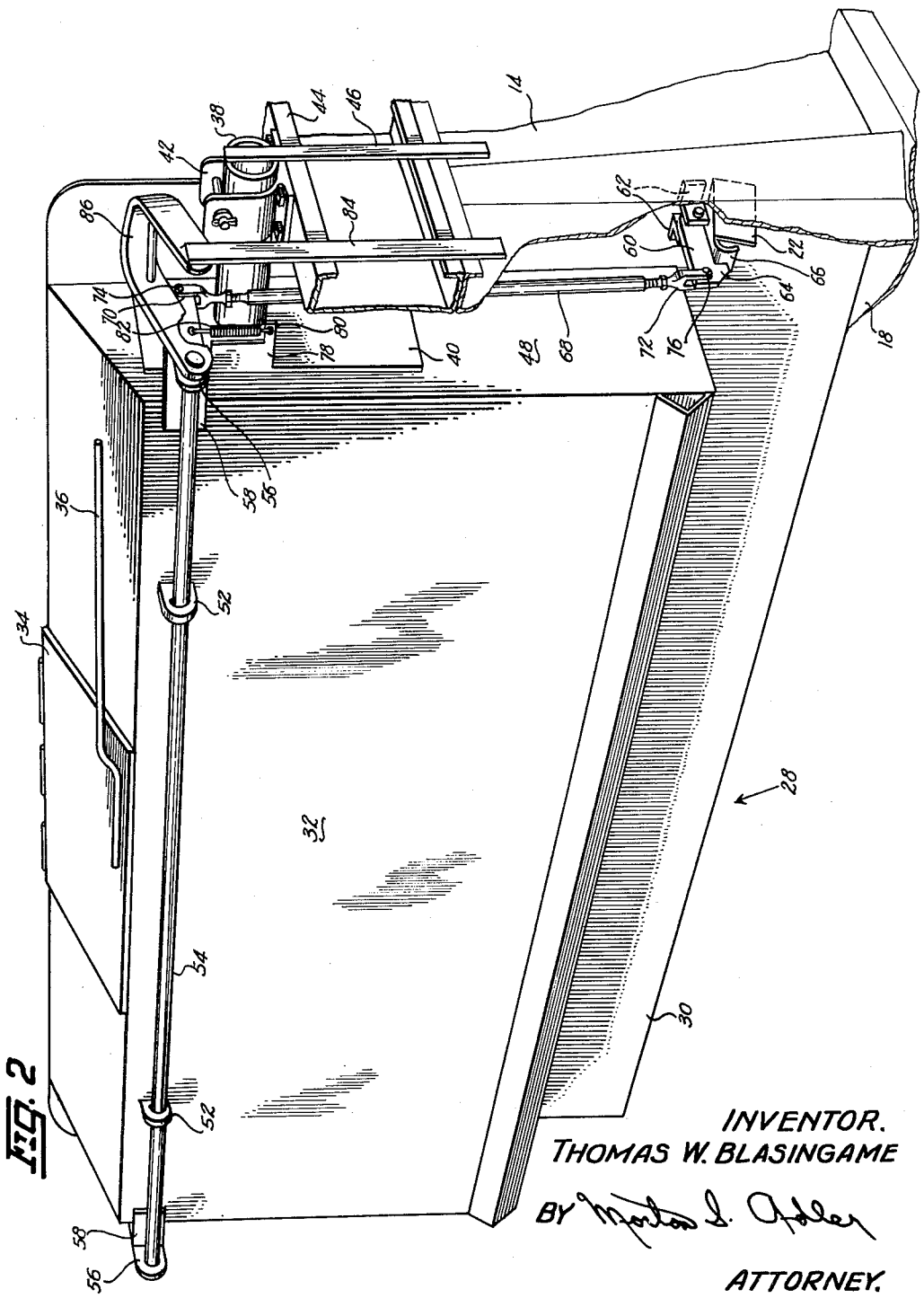

Sept. 11, 1962     T. W. BLASINGAME     3,053,573
BATCH BOX LOCKING DEVICE
Filed March 23, 1960     4 Sheets-Sheet 3
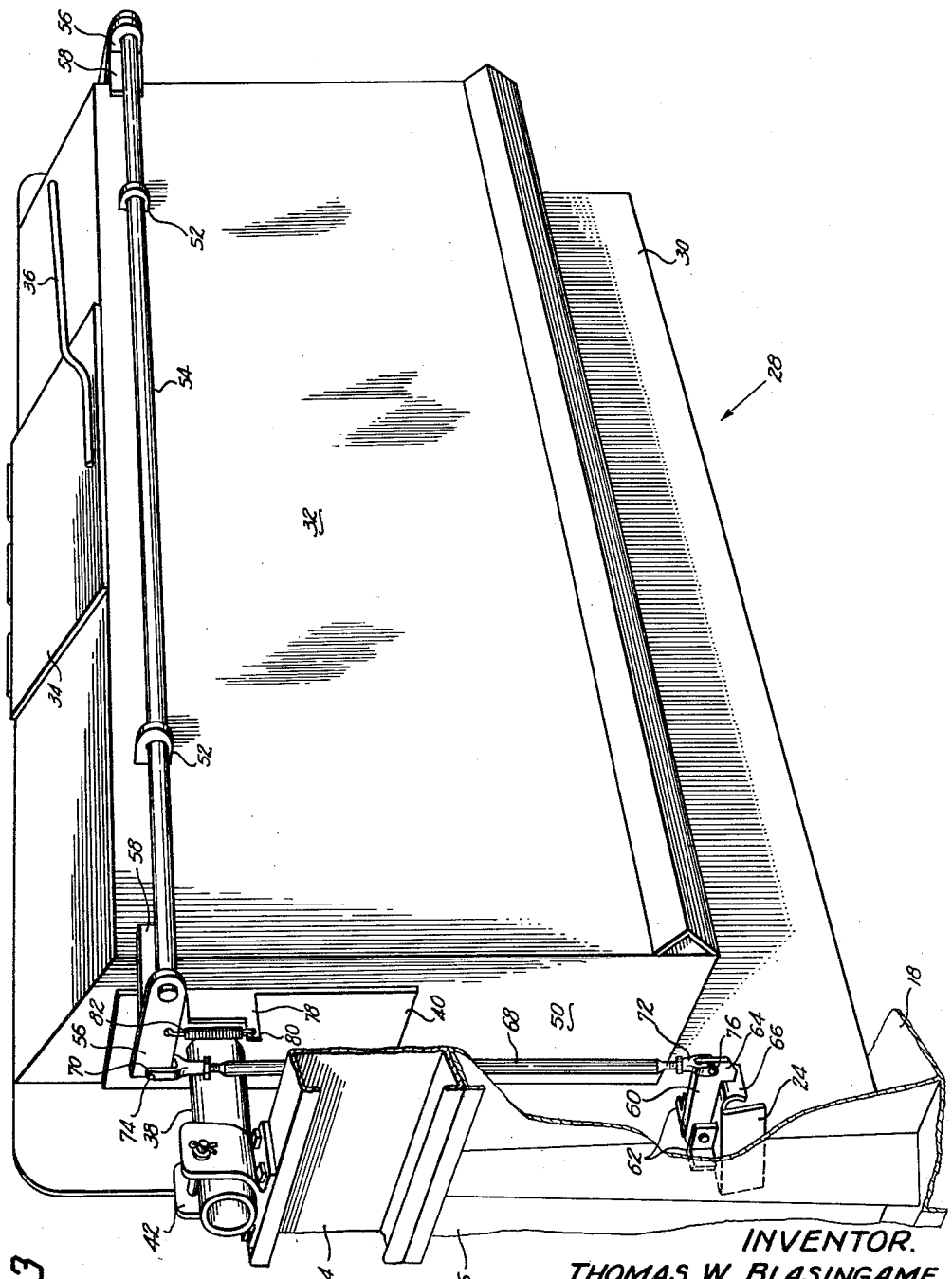
INVENTOR.
THOMAS W. BLASINGAME
BY Morton S. Adler
ATTORNEY.

Sept. 11, 1962 T. W. BLASINGAME 3,053,573
BATCH BOX LOCKING DEVICE
Filed March 23, 1960 4 Sheets-Sheet 4
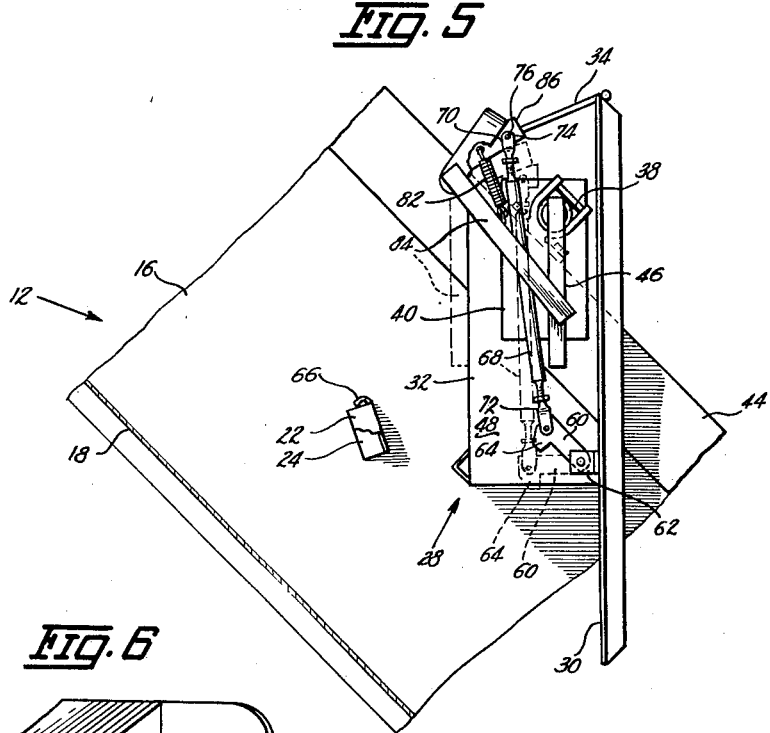
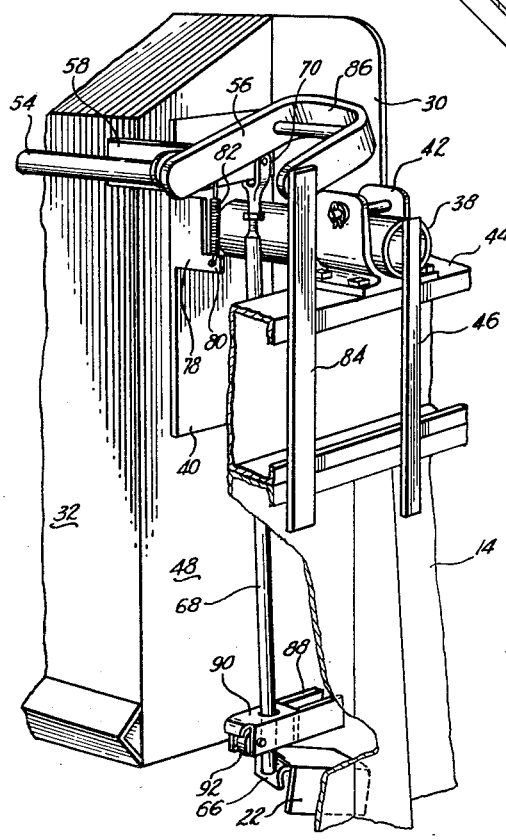
INVENTOR.
THOMAS W. BLASINGAME
ATTORNEY.

United States Patent Office 3,053,573
Patented Sept. 11, 1962

3,053,573
BATCH BOX LOCKING DEVICE
Thomas W. Blasingame, Oskaloosa, Iowa
(7½ St. Charles St., Rapid City, S. Dak.)
Filed Mar. 23, 1960, Ser. No. 17,113
13 Claims. (Cl. 298—8)

This invention relates to improvements in the locking device on batch boxes.

Such boxes, as relate to the invention to be described, are employed in standard dump truck bodies wherein a plurality of the same are swingably mounted in spaced relationship to form a plurality of compartments within the truck body. The boxes, when locked against swinging, form gate means for retaining a measured amount of moisture laden aggregate within the compartment defined by the spaced boxes and the swingable boxes serve as a receptacle for holding a premeasured amount of dry cement. One such box is formed on the inner side of the endgate of the truck. When the truck body is raised, the endgate is first released to swing to a vertical position whereby the aggregate in the first compartment adjacent the endgate is released and simultaneously mixed with cement from the box for dumping into the skip or loading apparatus of a mixer. Subsequently each of the boxes are successively released to mix the premeasured aggregate and cement in the proper portions.

Each of such batch boxes is provided with some form of releasable locking mechanism to hold it against swinging movement relative to the truck body until such time as the release of each box is desired. Such mechanism is usually of two general types, namely, rods with hooks which extend transversely of the truck body through the sideboards thereof and are operated by handles disposed at the outer side of the truck body, and rod means running under the floor of the truck bed with hook means extending up through holes in the floor of the bed. Certain disadvantages are readily apparent in both of these arrangements as follows. Operation of the rods and hooks are hampered by interference from rocks, cement and sand which accumulate about such parts and cast operating handles connected to such parts are generally not strong enough to overcome the resistance from the accumulations mentioned. The location of such mechanism is not readily accessible for inspection or maintenance and where holes are required in the floor bed, they must be plugged when the boxes are removed and the truck is used for hauling free flowing material. Without such plugging, leakage is a problem, and in some states such plugging is required by law.

Another disadvantage of the system employing rods and hooks within the truck is the fact that they remain in place when the batch boxes are removed and tend to restrict the dumping of sticky or spongy material such as dirt and clay. Also, if left in place, they tend to become damaged by falling material loaded into the truck and this adversely affects the subsequent operation of the batch boxes when they are arranged for use as described. While such rods and hooks can be removed from the truck when not needed, this requires considerable time, results in lost or damaged parts and is generally quite unsatisfactory.

Because of these removal difficulties, batch gates are not ordinarily removed from the haul trucks during the course of a paving job, whereas with an efficient system which would assure the easy removal of boxes and mechanisms together and eliminate adverse effects to the batch system by other hauling, the batch truck could also be used in hauling rock, sand, dirt, or other materials to the job. This would result in greater availability for the unit and greater flexibility in the company's operation and this invention is designed to achieve these results by overcoming the disadvantages pointed out.

Accordingly, with the above observations in mind, one of the important objects contemplated by this invention is the provision of a batch box wherein all of the moving parts necessary for a satisfactory releasable locking mechanism are mounted on the box structure so as to leave the truck body, in which the box is placed, free of any locking mechanism except for a relatively small fixed catch or stop bar that cooperates with the locking rod.

Another object inhering herein is to provide a locking mechanism on a batch box that is automatically self-locking when the dump body is lowered.

A further object is to provide a locking device of the above class that is constructed to operate indefinitely without lubrication and with a minimum of maintenance.

Other objects include a batch box with my improved locking device that requires a minimum of tools for mounting or dismounting; may be easily and quickly removed from a truck if any repairs are necessary or to make the truck available for other purposes; offers complete visibility and easy accessibility to all parts, and are uniform in structure and operation so as to be interchangeable.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a perspective view illustrating a dump truck equipped with batch boxes and in dumping position, FIG. 2 is an enlarged perspective view of a batch box from the front right side showing my locking device mounted thereon and including the operating handles, FIG. 3 is an enlarged perspective view of a batch box from the front left side showing the locking device thereon, FIG. 4 is a fragmentary elevational view of a tilted dump truck body showing the batch box therein in locked position, FIG. 5 is a view similar to FIG. 4, but showing the batch box in unlocked position with the locking mechanism in unlocking position in solid lines to show the position to which it is moved to release the box. The dotted line position of the locking mechanism illustrates the position to which it is returned for automatic relocking; and FIG. 6 is an enlarged fragmentary perspective view of this locking device illustrating a modified form of locking catch.

Referring to the drawings, a dump truck is designated generally by the numeral 10 to illustrate the environment in which my invention is used, such truck including the tiltable body 12 which, for purposes of reference, includes the sideboards 14 and 16 (FIGS. 2 and 3), bed or floor 18 and endgate 20. On the inner side of each sideboard 14 and 16 and in the lower portion thereof there is a plurality of projections or stop members in spaced relationship relative to the longitudinal axis of the body 12. Such stops are respectively oppositely disposed on sideboards 14 and 16 and one such pair is illustrated in FIGS. 2 and 3 and designated by the numerals 22 and 24. It will be noted that these stops extend from the respective sideboards slightly inwardly, upwardly and toward the front end 26 of body 12. Each pair of stops 22 and 24 serve the same purpose for separate batch boxes 28 and thus only one pair is shown to illustrate this invention. Batch boxes 28 may be of varied structure and those shown here which are only illustrative include a back plate 30 which carries a box member 32 on one side to be referred to as the front side relative to its position in body 12 as will later appear. Box 32 is shorter than plate 30 in overall dimensions so that plate 30 projects both laterally and downwardly from the box as shown in FIGS. 2 and 3. Box 32 may be provided with a hinged lid 34, operable by handle 36 designed to be accessible from outside the truck, and generally has an open bottom. On opposite sides of box 32 near the top are the respective axially aligned shafts 38 projecting from support plates 40 adapted to be rotatably journalled in the respective bearings 42 mounted generally on the top of an extension rail 44 which is secured to the top of each respective sideboard 14 and 16.

Plates 30 are of sufficient size to serve as a partition or gate when placed in body 12 and it will be understood as pointed out earlier, that several of such box assemblies 28 are placed in the body 12 to divide it into a plurality of compartments. Box assemblies are placed so that box members 32 are toward the front of the truck 10 and are designed to swing by rotation of shafts 38 when body 12 is tilted. Shaft 38 carries a rigidly attached handle 46 suspended over sideboard 14 (the driver's side of the truck) for manual operation if necessary.

The truck and batch box assembly so fas described is not new and has been set forth to better understand my locking device for controlling the swinging movement of the box relative to the body 12. Such locking device preferably comprises duplicate assemblies at each side 48 and 50 of the box 32 (FIGS. 2 and 3) except for handle operating means on the driver's side of the truck (FIG. 2) for simultaneously operating both assemblies and in the description which follows, like parts will be given like numerals.

Referring now more particularly to FIGS. 2 and 3, a pair of laterally spaced ears 52 on the front side of box 32 near the top rotatably supports a transverse shaft 54 which projects laterally beyond both box sides 48 and 50. Each end of shaft 54 is secured to the forward end of a rearwardly extending lever 56 and a spacer or stop bar 58 secured to each end of the front side of box 32 projects beyond the respective box sides 48 and 50 to abut levers 56 and thus limit any lateral movement of shaft 54 relative to box 32. Below lever 56 at a point approximately adjacent the bottom of box 32 a hook member 60 is pivotally secured at one end to spaced ears 62 secured to the front side of plate 30 and extends therefrom forwardly so that at its other end, the hook portion 64 can engage a curved lip 66 on the respective stops 22 and 24 attached to body 12 as previously described. Hook end 64 of hook member 60 is linked to the rearward end of lever 56 and for this purpose I employ an operating rod 68 having the longitudinally adjustable clevis members 70 and 72 on the respective upper and lower ends thereof. Clevis 70 is removably pivotally secured to lever 56 by a pin 74 and clevis 72 is similarly secured to hook member 60 by a pin 76.

On each box side 48 and 50, a vertically disposed bracket 78 projects from plate 40 so that the upper edge is in close spaced relationship to the underside of lever 56 and serves as a limiting means against excessive movement of lever 56 as will later appear. The lower portion of bracket 78 includes a projecting shoulder 80 and a coil spring 82 is engaged between shoulder 80 and lever 56 at a point intermediate the lever ends.

Hook members 60 are simultaneously operated by handle means from the driver's side of the truck as follows, reference being made more particularly to FIG. 2. A handle 84 disposed on the outer side of the truck body side 14 parallel to handle 46 includes a gooseneck rigid link connection 86 to one end of shaft 56 for rotating the same. Connection 86 is utilized to transmit action of handle 84 over the barrier imposed by the sidewall 14 and extension 44 to shaft 56 since handle 84 is positioned for easy access by an operator standing on the ground beside the truck.

It will be understood that a plurality of spaced box assemblies 28 are employed in a single truck body 12 and each assembly will be equipped with locking devices as above described. The general arrangement of such assemblies is illustrated in FIG. 1 relative to body 12 and when in locked position, boxes 32 and plates or gates 30 will be perpendicular to the bed or floor 18 with hook members 60 engaged with the respective stops 22 and 24. Pates 30 serve as gates or partitions to divide the truck body into a plurality of compartments where pre-measured amounts of aggregate are contained to be mixed with pre-measured amounts of cement in boxes 32. The locked position of the box assembly 28 is maintained after body 12 is tilted as shown in FIG. 4 and the aggregate and cement relative to each box assembly is successively released from rear to front of body 12 beginning, of course, with the endgate 20. To release the successive box assemblies, as shown in FIG. 4, for example, an operator standing on the ground outside of the truck on the driver's side, moves handle 84 rearwardly to rotate shaft 54 and simultaneously actuate levers 56 whereby rods 68 are elevated causing hook members 60 to become disengaged from stops 22 and 24. When this is accomplished, box assemblies 28 will swing by gravity on shafts 38 to a vertical position as shown in FIG. 5 so that the aggregate and cement held by gate 30 is released. As soon as handle 84 is released, springs 82 will supplement the force of gravity in returning shafts 68 and hook members 60 to their original position and the efficiency of this action by springs 82 is increased by brackets 78 which limit any excessive travel of levers 56. Such springs 82 also serve initially to maintain hooks 60 in locked position against any bouncing motion of the truck. As the truck body 12 is returned from tilted to horizontal position, hooks 60 will ride over surface 66 of stops 22 and 24 and automatically become re-engaged therewith. Handle 46, previously described, is present in batch boxes commonly used and its purpose is to afford means for manually rotating assembly 28. Such boxes as currently used do not have self-locking features of the type here disclosed and frequently when the body 12 is lowered, it is necessary to use handle 46 to rock the box assembly into locked position. This is not required in my invention, but has been illustrated since it is present on batch boxes to which my locking device has been applied.

With reference now to FIG. 6, I show a modified arrangement for locking engagement with stops 22 and 24. In such arrangement, the lower end of rod 68 is free of any clevis 72 as described previously, and projects downwardly through a guide member 88 attached to box side 48. Member 88 includes a cover plate 90 on a roller 92. Shaft 68 tangentially engages roller 92 to eliminate locking or binding action caused by weight of material in and around the box assembly 28 and is adapted to engage surface 66 of members 22 and 24 the same as hook member 60 above described and operates in the same manner.

From the above description, it will be apparent that all mechanism except for stops 22 and 24 are mounted to box 32 so that by removal of box assembly 28 from the truck, the truck body is free of obstruction from rods, hooks and the like, except the said stops, for use in hauling other materials and there are no floor holes to be plugged. All parts of this locking device are easily visible and accessible for inspection and maintenance and if repairs are required, an entire assembly 28 can be removed for that purpose and another one installed so that the truck is not tied up while such repairs are being made. It is recommended that lubrication be eliminated in this device since this attracts dust and other particles causing failure of parts. Metal to metal bearing surfaces have been kept at a minimum and any holes required have been drilled oversize so that working parts are not affected by the build-up of cement dust and the like.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a stop member projecting inwardly from the interior of said truck body, movable stop engaging means mounted solely on said batch box for releasable engagement with said stop member to hold said batch box against swinging movement, and manually operable means exteriorly of said truck body and operably connected to said stop engaging means for releasing said stop engaging means from engagement with said stop member.

2. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a lever rotatably mounted at one end to one side of said batch box, a hook member similarly mounted to said side of said batch box and spaced below said lever, an operating rod pivotally connected at respective ends to the respective free ends of said lever and hook member, a stop member projecting inwardly from the interior of said truck body, said hook member being releasably engageable with said stop member, and a manually operable handle operably connected to said lever for rotating the same whereby said hook member can be disengaged from said stop member.

3. A locking device as defined in claim 2 wherein said handle is disposed at the outer side of the truck body in which the batch box is disposed and said handle includes a rigid gooseneck link for transmitting force over the barrier imposed by the sideboard of the truck body to said lever.

4. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a lever rotatably mounted at one end to one side of said batch box, a hook member similarly mounted to said side of said batch box and spaced below said lever, an operating rod pivotally connected at respective ends to the respective free ends of said lever and hook member, a bracket on said side of said batch box intermediate said lever and said hook member, spring means connecting said lever to said bracket to yieldingly hold said lever in a predetermined position, said lever when rotated engageable with said bracket whereby the movement of said lever is limited in one direction, a stop member projecting inwardly from the interior of said truck body, said hook member being releasably engageable with said stop member, a manually operable handle operably connected to said lever for rotating the same whereby said hook member can be disengaged from said stop member, and said lever when rotated by said handle automatically returnable by said spring means to the position from which it was rotated whereby said hook member is in position for automatic re-engagement with said stop member.

5. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a lever rotatably mounted at one end to one side of said batch box, a guide member secured to said side of said batch box and spaced below said lever, a stop member projecting inwardly from the interior of said truck body, a vertically disposed operating rod pivotally secured at its upper end to the free end of said lever and vertically movable through an opening in said guide member so that its lower end is in abutting engagement with said stop member, and a manually operable handle connected to said lever for rotating the same whereby said rod can be raised to a position free of contact with said stop member.

6. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a lever rotatably mounted at one end to one side of said batch box, a guide member secured to said side of said batch box and spaced below said lever, a stop member projecting inwardly from the interior of said truck body, a vertically disposed operating rod pivotally secured at its upper end to the free end of said lever and vertically movable through an opening in said guide member so that its lower end is in abutting engagement with said stop member, a manually operable handle connected to said lever for rotating the same whereby said rod can be raised to a position free of contact with said stop member, a bracket on said side of said batch box below said lever, and spring means connecting said lever to said bracket for automatically lowering said rod after it has been manually raised by said handle.

7. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a lever rotatably mounted at one end to one side of said batch box, a guide member secured to said side of said batch box and spaced below said lever, a roller in said guide member, a stop member projecting inwardly from the interior of said truck body, a vertically disposed operating rod pivotally secured at its upper end to the free end of said lever and vertically movable through said guide member in tangential engagement with said roller so that its lower end is in abutting engagement with said stop member, and a manually operable handle connected to said lever for rotating the same whereby said rod can be raised to a position free of contact with said stop member.

8. A locking device as defined in claim 5 wherein said handle is disposed at the outer side of the truck body in which the batch box is disposed and said handle includes a rigid gooseneck link for transmitting force over the barrier imposed by the sideboard of the truck body to said lever.

9. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a stop member projecting inwardly from the interior of said truck body, movable catch means mounted solely on said batch box for releasable engagement with said stop member to hold said batch box against swinging movement, handle means disposed exteriorly of said truck body and operatively connected to said catch means, and said handle means including a rigid gooseneck link for transmitting force over the barrier imposed by the sideboard of said truck body to said catch means whereby connection between said handle and catch means is free of contact with and attachment to said truck body.

10. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a pair of spaced bearing ears on said batch box, a shaft rotatably supported in said ears, said shaft projecting beyond the respective batch box sides adjacent said truck body sideboards, means on said batch box to limit the longitudinal movement of said shaft relative thereto, a catch means at each side of said batch box operatively connected to respective ends of said shaft, oppositely disposed stop members projecting inwardly from respective opposite sides of the interior of said truck body, said catch means being releasably engageable with said stop members to hold said batch box against swinging movement, and handle means disposed exteriorly of one side of said truck body operatively connected to one end of said shaft for simultaneously actuating said catch means.

11. A locking device as defined in claim 10 wherein said handle includes a rigid gooseneck link for transmitting force over the barrier imposed by the sideboard of said truck body to said shaft whereby connection between said handle and shaft is free of contact with and attachment to said truck body.

12. In the combination of a batch box in a dump truck body having sideboards where said batch box is normally vertically positioned and disposed transversely of the sides of said truck body to serve as a partition thereon and swingably mounted to said sides whereby it can be swingably suspended in a vertical position when said truck body is tilted, a releasable locking means to hold said batch box against movement relative to said truck body at times, comprising a pair of spaced bearing ears on said batch box, a shaft rotatably supported in said ears, said shaft projecting beyond the respective batch box sides adjacent said truck body sideboards, means on said batch box to limit the longitudinal movement of said shaft relative thereto, a catch means at each side of said batch box, oppositely disposed stop members projecting inwardly from respective opposite sides of the interior of said truck body, said catch means being releasably engageable with said stop members to hold said batch box against swinging movement, a lever secured to each end of said shaft for rotation thereby, an operating rod pivotally connected at respective ends between and to said lever and catch means at respective sides of said batch box, spring means at each batch box side connected to said respective levers to yieldingly urge them to a predetermined position, and handle means disposed exteriorly of one side of said truck body operatively connected to one end of said shaft for simultaneously actuating said catch means.

13. A device as defined in claim 12 including means on respective sides of said batch box engageable with said respective levers to limit their movement in one direction.

References Cited in the file of this patent
UNITED STATES PATENTS

| | | |
|---|---|---|
| 1,376,146 | Kahn et al. | Apr. 26, 1921 |
| 1,650,249 | Venable | Nov. 22, 1927 |